US009368815B2

(12) United States Patent
Sato et al.

(10) Patent No.: US 9,368,815 B2
(45) Date of Patent: Jun. 14, 2016

(54) FUEL CELL (71) Applicant: HONDA MOTOR CO., LTD., Tokyo (JP)

(72) Inventors: Shuji Sato, Wako (JP); Masahiko Sato, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 389 days.

(21) Appl. No.: 13/748,595

(22) Filed: Jan. 24, 2013

(65) Prior Publication Data
US 2013/0196249 A1    Aug. 1, 2013

(30) Foreign Application Priority Data

Jan. 27, 2012    (JP) ................................. 2012-014700

(51) Int. Cl.
    *H01M 8/04*    (2016.01)
    *H01M 8/02*    (2016.01)
    *H01M 8/10*    (2016.01)
(52) U.S. Cl.
    CPC ........ *H01M 8/04201* (2013.01); *H01M 8/0247* (2013.01); *H01M 8/0258* (2013.01); *H01M 2008/1095* (2013.01); *Y02E 60/50* (2013.01)
(58) Field of Classification Search
    CPC combination set(s) only.
    See application file for complete search history.

(56) References Cited

U.S. PATENT DOCUMENTS

| 7,736,785 B2 * | 6/2010 | Oda et al. ...................... 429/457 |
| 2008/0292930 A1 * | 11/2008 | Oda et al. ........................ 429/26 |
| 2010/0129694 A1 | 5/2010 | Sugiura et al. |
| 2012/0301815 A1 | 11/2012 | Yoshimine |

FOREIGN PATENT DOCUMENTS

| JP | 10-172594 | 6/1998 |
| JP | 2009-004230 | 1/2009 |
| JP | 2010-086852 | 4/2010 |

OTHER PUBLICATIONS

Japanese Office Action for corresponding JP Application No. 2012-014700, Oct. 20, 2015 (w/ English machine translation).

* cited by examiner

*Primary Examiner* — Ula C Ruddock
*Assistant Examiner* — Osei Amponsah
(74) *Attorney, Agent, or Firm* — Mori & Ward, LLP (57) ABSTRACT A fuel cell includes a membrane electrode assembly and a separator. The separator includes a reactant gas inlet manifold, a reactant gas outlet manifold, a reactant gas channel, an inlet connection channel, an inlet buffer portion, an outlet buffer portion, and an outlet connection channel. A pressure drop through the inlet buffer portion is less than a pressure drop through the reactant gas channel when a reactant gas flows from the reactant gas inlet manifold to the reactant gas channel. A pressure drop through the outlet buffer portion is less than a pressure drop through the outlet connection channel when the reactant gas flows from the reactant gas channel to the reactant gas outlet manifold.

12 Claims, 5 Drawing Sheets

BACKGROUND ART

FUEL CELL

CROSS-REFERENCE TO RELATED APPLICATIONS

The present application claims priority under 35 U.S.C. §119 to Japanese Patent Application No. 2012-014700, filed Jan. 27, 2012, entitled "Fuel Cell." The contents of this application are incorporated herein by reference in their entirety.

BACKGROUND OF THE INVENTION

1. Field of the Invention

The present disclosure relates to a fuel cell.

2. Discussion of the Background

A solid polymer electrolyte fuel cell, for example, includes unit cells. Each of the unit cells includes a membrane electrode assembly (MEA) and a pair of separators sandwiching the MEA therebetween. The MEA includes an electrolyte membrane, which is a polymer ion-exchange membrane, and an anode electrode and a cathode electrode sandwiching the electrolyte membrane therebetween. The solid polymer electrolyte fuel cell, which usually includes a certain number of unit cells that are stacked together, is used as a fuel cell stack for an electric vehicle.

In the fuel cell, a fuel gas channel (reactant gas channel) for supplying a fuel gas to the anode electrode is formed on a surface of one of the separators, and an oxidant gas channel (reactant gas channel) for supplying an oxidant gas to the cathode electrode is formed on a surface of the other of the separators. Moreover, a coolant channel, through which coolant flows, extends along surfaces of the separators of the unit cells that are adjacent to each other.

Some fuel cells have a so-called internal manifold structure. The internal manifold structure is built up of a reactant gas inlet manifold, a reactant gas outlet manifold, a coolant inlet manifold, and a coolant outlet manifold. These manifolds are disposed in the fuel cell and extend through the fuel cell in the stacking direction of the separators. In the fuel cell stack, it is necessary to uniformly supply a reactant gas to a plurality of reactant gas channel of each separator.

Figure 5:
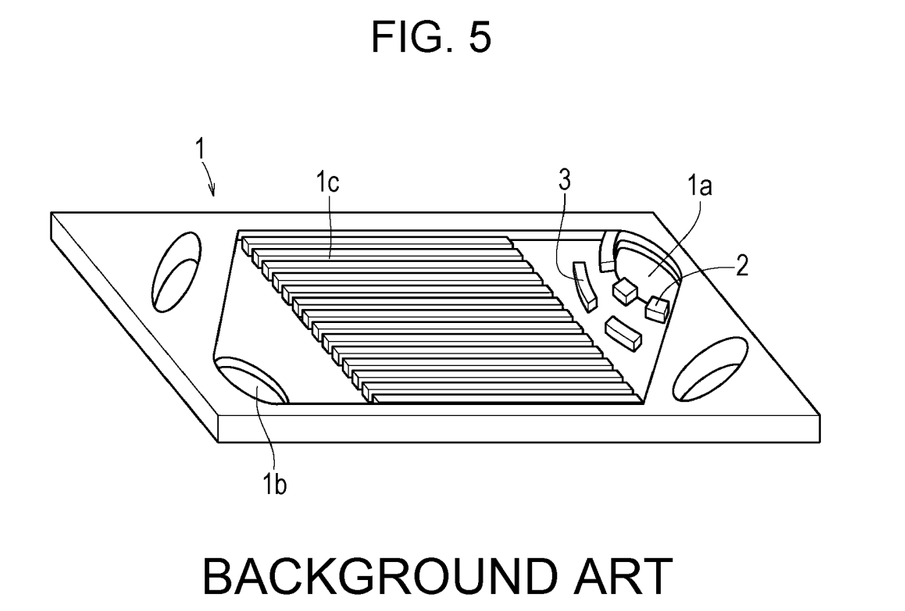
FIG. 5 is a perspective view of a fuel cell of the related art.

Japanese Unexamined Patent Application Publication No. 10-172594, for example, describes a fuel cell that addresses this problem. The fuel cell is formed by stacking a separator 1 as illustrated in FIG. 5 and a unit cell (not shown) on top of the other. The unit cell includes an air electrode, a fuel electrode, and a solid electrolyte layer sandwiched between these electrodes. A gas supply hole $1a$ and a gas outlet hole $1b$ are formed in opposite corners of the separator 1, and a plurality of gas distribution grooves $1c$ are formed in a surface of the separator 1.

One or both of a gas flow regulating portion 2 and an obstacle 3 is formed in one or both of a gas inlet portion and a gas outlet portion of the separator 1, and/or the depth of the gas distribution grooves $1c$ is made to be less than the depths of other parts of the grooves, and thereby a pressure dropping function is provided.

The fuel cell is configured to uniformly distribute the gas by increasing the pressure drop through the gas inlet portion, the gas outlet portion, and the gas distribution grooves $1c$.

SUMMARY OF THE INVENTION

According to one aspect of the present invention, a fuel cell includes a membrane electrode assembly and a separator. The membrane electrode assembly includes a first electrode, a second electrode, and an electrolyte membrane provided between the first electrode and the second electrode in a stacking direction. The separator is provided on the membrane electrode assembly. The separator includes a reactant gas inlet manifold, a reactant gas outlet manifold, a reactant gas channel, an inlet connection channel, an inlet buffer portion, an outlet buffer portion, and an outlet connection channel. A reactant gas is to flow in the stacking direction through the reactant gas inlet manifold. The reactant gas is to flow in the stacking direction through the reactant gas outlet manifold. The reactant gas is to be supplied along an electrode surface of the membrane electrode assembly through the reactant gas channel. The reactant gas channel connects the reactant gas inlet manifold to the reactant gas outlet manifold. The inlet connection channel is provided between the reactant gas inlet manifold and the reactant gas channel and includes a plurality of channel grooves. The inlet buffer portion is provided between the inlet connection channel and the reactant gas channel to regulate flow of the reactant gas. A pressure drop through the inlet buffer portion is less than a pressure drop through the reactant gas channel when the reactant gas flows from the reactant gas inlet manifold to the reactant gas channel. The outlet buffer portion is provided between the reactant gas channel and the reactant gas outlet manifold to regulate flow of the reactant gas. The outlet connection channel is provided between the outlet buffer portion and the reactant gas outlet manifold and including a plurality of channel grooves. A pressure drop through the outlet buffer portion is less than a pressure drop through the outlet connection channel when the reactant gas flows from the reactant gas channel to the reactant gas outlet manifold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Figure 1:
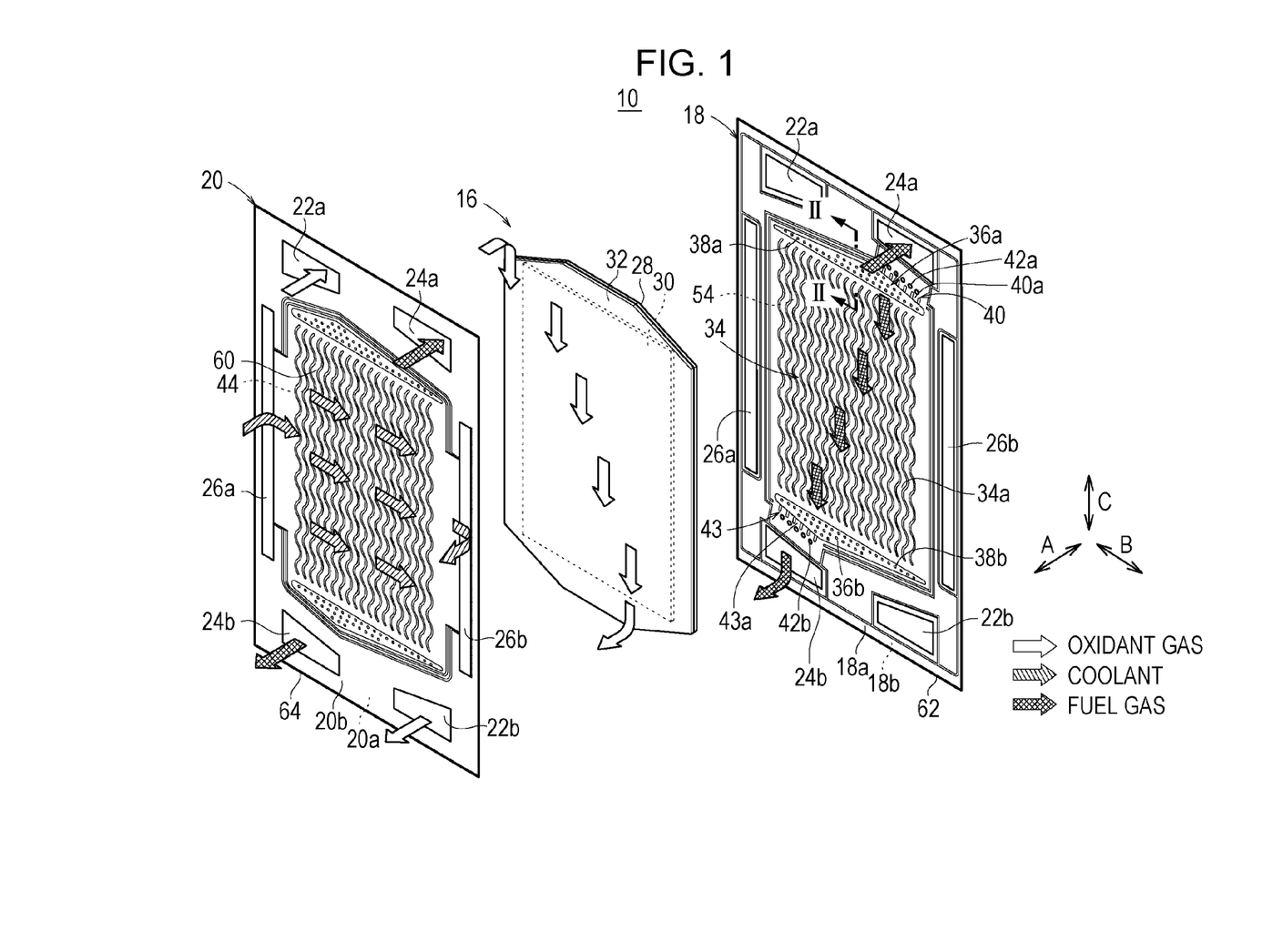
FIG. 1 is an exploded perspective view illustrating a main portion of a fuel cell according to an embodiment.

As illustrated in FIG. 1, a fuel cell 10 includes a membrane electrode assembly 16 (MEA) sandwiched between a first metal separator 18 on the anode side and a second metal separator 20 on the cathode side. A fuel cell stack is formed by staking a plurality of the fuel cells 10 together, for example, in the horizontal direction (in the direction of arrow A). The fuel cell stack is mounted, for example, in a fuel-cell electric vehicle.

Each of the first metal separator 18 and the second metal separator 20, which has rectangular flat surfaces, is formed by pressing forming a thin metal plate so as to have wave-shaped protrusions and recesses in a sectional view. Each of the first metal separator 18 and the second metal separator 20 is made from, for example, a steel plate, a stainless steel plate, an aluminum plate, a plated steel plate, or a metal plate coated with an anticorrosion coating. Alternatively, carbon separators may be used instead of the first metal separator 18 and the second metal separator 20.

An oxidant gas inlet manifold 22a (reactant gas inlet manifold) and a fuel gas inlet manifold 24a (reactant gas inlet manifold) extend in the direction of arrow A through an upper end portion of the fuel cell 10 in the longitudinal direction (in the direction of arrow C in FIG. 1). An oxidant gas, such as an oxygen-containing gas, is supplied through the oxidant gas inlet manifold 22a. A fuel gas, such as a hydrogen-containing gas, is supplied through the fuel gas inlet manifold 24a.

A fuel gas outlet manifold 24b (reactant gas outlet manifold) and an oxidant gas outlet manifold 22b (oxidant gas outlet manifold) extend in the direction of arrow A through a lower end portion of the fuel cell 10 in the longitudinal direction. The fuel gas is discharged through the fuel gas outlet manifold 24b. The oxidant gas is discharged through the oxidant gas outlet manifold 22b.

The oxidant gas inlet manifold 22a and the oxidant gas outlet manifold 22b are disposed at positions that are point-symmetric to each other. The fuel gas inlet manifold 24a and the fuel gas outlet manifold 24b are disposed at positions that are point-symmetric to each other.

A coolant inlet manifold 26a extends in the direction of arrow A through one end portion of the fuel cell 10 in the transversal direction (in the direction of arrow B). A coolant is supplied through the coolant inlet manifold 26a. A coolant outlet manifold 26b extends in the direction of arrow A through the other end portion of the fuel cell 10 in the transversal direction. The coolant is discharged through the coolant outlet manifold 26b.

The membrane electrode assembly 16 includes a solid polymer electrolyte membrane 28, and an anode electrode 30 and a cathode electrode 32 that sandwich the solid polymer electrolyte membrane 28 therebetween. The solid polymer electrolyte membrane 28 is, for example, a thin film made of a perfluorosulfonate polymer that is impregnated with water. The membrane electrode assembly 16 is a so-called stepped MEA, in which the area of the anode electrode 30 is smaller than that of the cathode electrode 32. Alternatively, the area of the cathode electrode 32 may be smaller that that of the anode electrode 30. As a further alternative, the area of the cathode electrode 32 may be the same as that of the anode electrode 30.

The anode electrode 30 and the cathode electrode 32 each include a gas diffusion layer (not shown) and an electrode catalyst layer (not shown). The gas diffusion layer is made of carbon paper and the like. The electrode catalyst layer is made by uniformly coating a surface of the gas diffusion layer with porous carbon particles whose surfaces support a platinum alloy. The electrode catalyst layer is disposed on each of two sides of the solid polymer electrolyte membrane 28.

Figure 3:
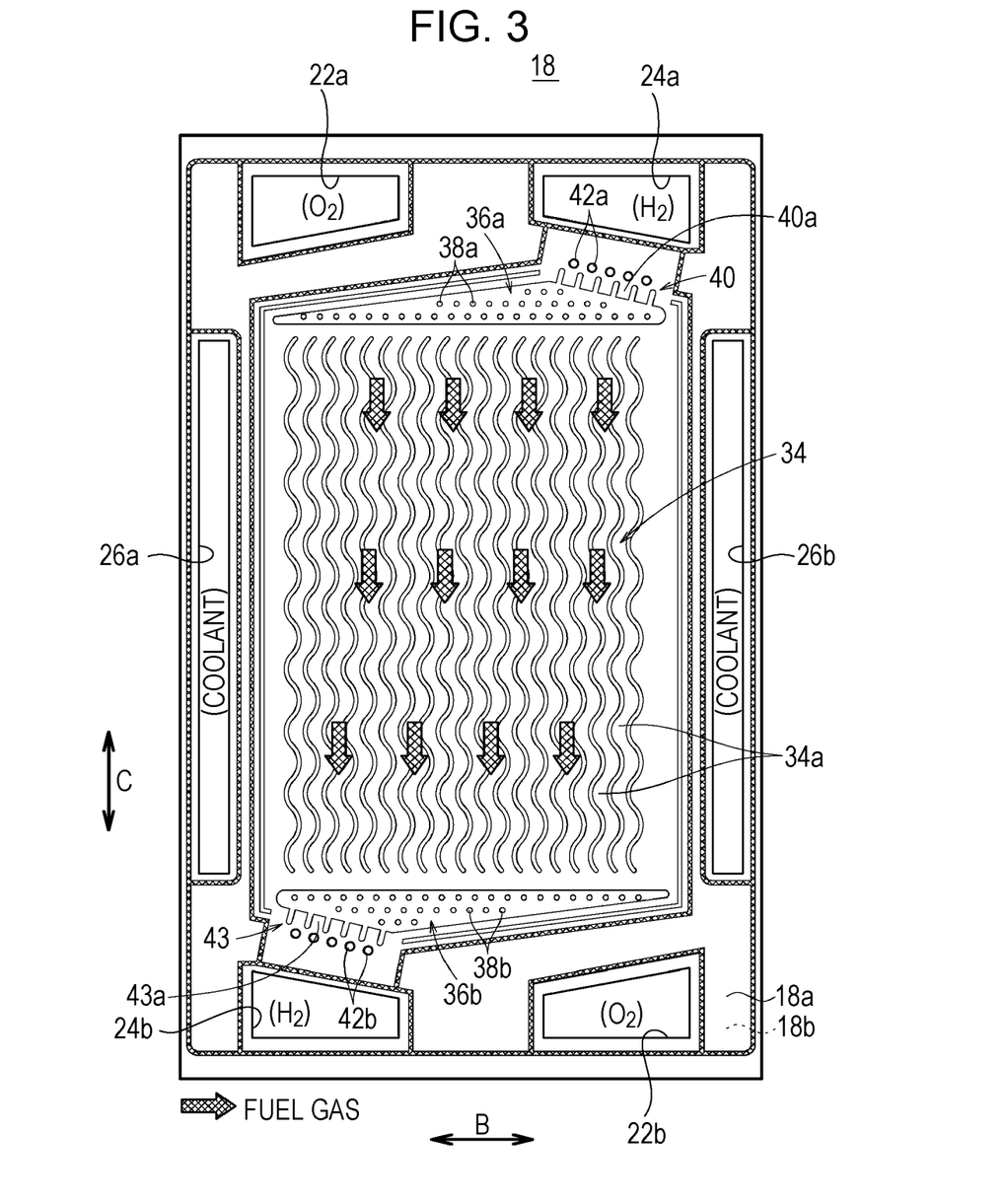
FIG. 3 is a front view of a first metal separator of the fuel cell.

A fuel gas channel 34, through which the fuel gas inlet manifold 24a and the fuel gas outlet manifold 24b are connected to each other, is formed on a surface 18a of the first metal separator 18 facing the membrane electrode assembly 16. As illustrated in FIG. 3, the fuel gas channel 34 includes a plurality of wave-shaped channel grooves 34a extending in the direction of arrow C. An inlet buffer portion 36a and an outlet buffer portion 36b are respectively disposed at the upper end and the lower end of the wave-shaped channel grooves 34a in the direction of arrow C. The fuel gas channel 34 may include a plurality of linear channel grooves instead of the wave-shaped channel grooves 34a.

The inlet buffer portion 36a and the outlet buffer portion 36b have substantially triangular shapes that are point-symmetric to each other. A plurality of embossed portions 38a and a plurality of embossed portions 38b are respectively disposed in the inlet buffer portion 36a and the outlet buffer portion 36b. The vertices of the triangular shapes of the inlet buffer portion 36a and the outlet buffer portion 36b are located within the width of the fuel gas channel 34.

An inlet connection channel 40, which extends toward the fuel gas inlet manifold 24a, is formed in the inlet buffer portion 36a by press forming. The inlet connection channel 40 includes a plurality of channel grooves 40a between protruding portions. A plurality of supply holes 42a are formed near an upstream side of the inlet connection channel 40. The supply holes 42a are connected to the fuel gas inlet manifold 24a on a surface 18b side(back side).

An outlet connection channel 43, which extends toward the fuel gas outlet manifold 24b, is formed in the outlet buffer portion 36b by press forming. The outlet connection channel 43 includes a plurality of channel grooves 43a between protruding portions. A plurality of discharge holes 42b are formed near a downstream side of the outlet connection channel 43. The discharge holes 42b are connected to the fuel gas outlet manifold 24b on the surface 18b side (back side).

The entire pressure drop (the pressure drop as the total amount, which will be simply referred to as the "pressure drop" hereinafter) through the inlet buffer portion 36a is set less than the pressure drop through the fuel gas channel 34. The pressure drop through the outlet buffer portion 36b is set less than the pressure drop through the outlet connection channel 43.

To be specific, the pressure drop through the fuel gas channel 34 is increased by increasing the length of the wave-shaped channel grooves 34a. The pressure drop through the inlet buffer portion 36a is decreased by increasing the dimension thereof in the depth direction (stacking direction). The pressure drop through the outlet connection channel 43 is increased by making the number of the channel grooves 43a be less than the number of the wave-shaped channel grooves 34a of the fuel gas channel 34.

Figure 4:
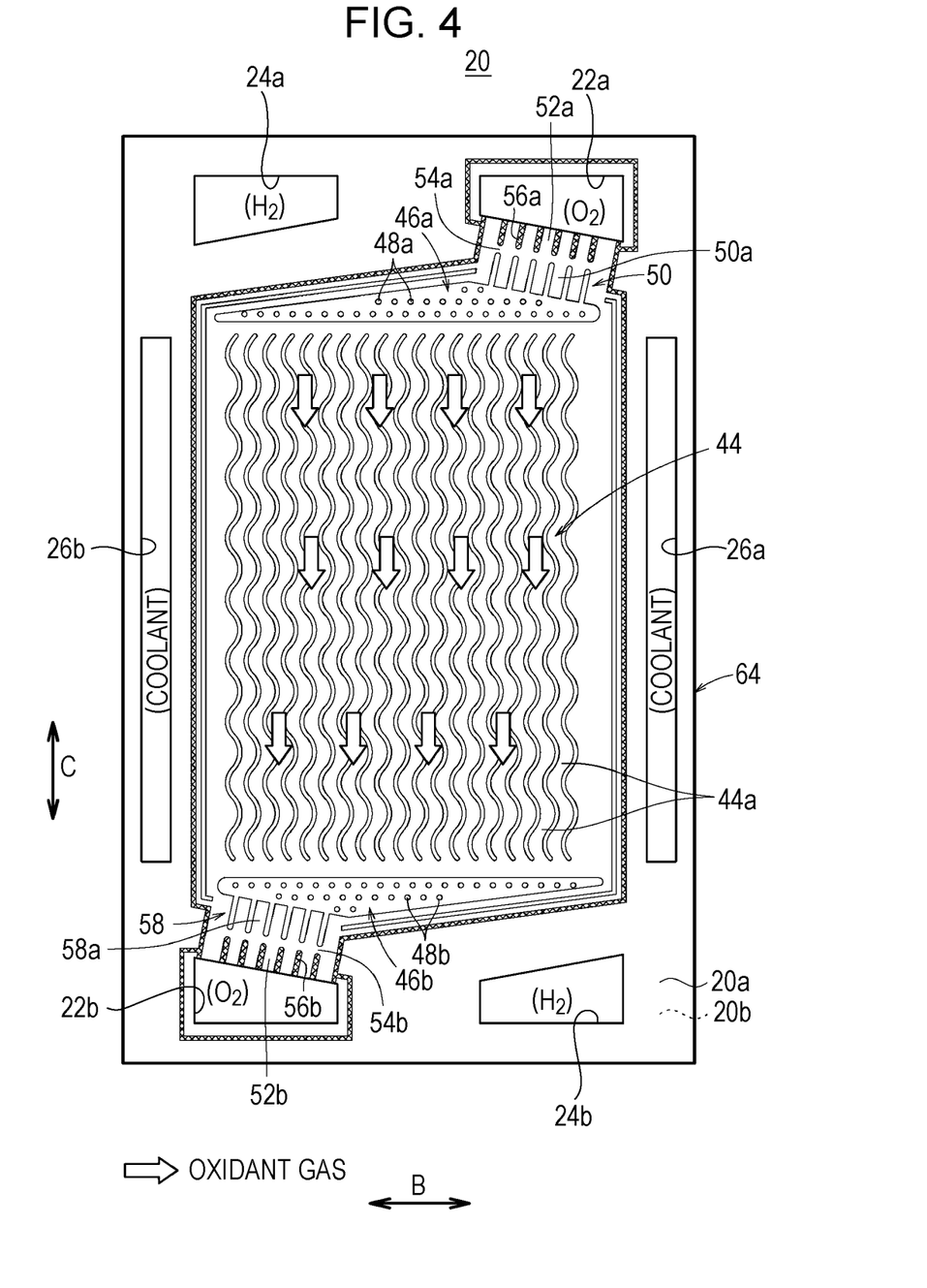
FIG. 4 is a front view of a second metal separator of the fuel cell.

As illustrated in FIG. 4, an oxidant gas channel 44, through which the oxidant gas inlet manifold 22a and the oxidant gas outlet manifold 22b are connected to each other, is formed on a surface 20a of the second metal separator 20 facing the membrane electrode assembly 16.

The oxidant gas channel 44 includes a plurality of wave-shaped channel grooves 44a extending in the direction of arrow C. An inlet buffer portion 46a and an outlet buffer portion 46b are respectively disposed at the upper end and the lower end of the wave-shaped channel grooves 44a in the direction of arrow C. The inlet buffer portion 46a and the outlet buffer portion 46b have substantially triangular shapes that are point-symmetric to each other. A plurality of embossed portions 48a and a plurality of embossed portions 48b are respectively disposed in the inlet buffer portion 46a and the outlet buffer portion 46b. The oxidant gas channel 44 may include a plurality of linear channel grooves instead of the wave-shaped channel grooves 44a.

An inlet connection channel 50, which extends toward the oxidant gas inlet manifold 22a, is formed in the inlet buffer portion 46a by press forming. The inlet connection channel 50 includes a plurality of channel grooves 50a between protruding portions. Between the oxidant gas inlet manifold 22a and the inlet connection channel 50, an oxidant gas inlet channel 52a (reactant gas inlet channel) and an inlet-side gap portion 54a are disposed in this order in the direction in which the oxidant gas flows. The inlet-side gap portion 54a makes the flow of the oxidant gas be discontinuous.

The oxidant gas inlet channel 52a is formed from a rubber bridge 56a, which is integrally formed with a second sealing member 64 described below. The inlet-side gap portion 54a is disposed between the oxidant gas inlet channel 52a and the inlet connection channel 50.

An outlet connection channel 58, which extends toward the oxidant gas outlet manifold 22b, is formed in the outlet buffer portion 46b by press forming. The outlet connection channel 58 includes a plurality of channel grooves 58a between protruding portions. Between the oxidant gas outlet manifold 22b and the outlet connection channel 58, an outlet-side gap portion 54b and an oxidant gas outlet channel 52b (reactant gas outlet channel) are disposed in this order in the direction in which the oxidant gas flows. The outlet-side gap portion 54b makes the flow of the oxidant gas be discontinuous.

The oxidant gas outlet channel 52b is formed from a rubber bridge 56b, which is integrally formed with the second sealing member 64 described below. The outlet-side gap portion 54b is disposed between the oxidant gas outlet channel 52b and the outlet connection channel 58.

The pressure drop through the inlet buffer portion 46a is set less than the pressure drop through the oxidant gas channel 44. The pressure drop through the outlet buffer portion 46b is set less than the pressure drop through the outlet connection channel 58.

To be specific, the pressure drop through the oxidant gas channel 44 is increased by increasing the length of the wave-shaped channel grooves 44a. The pressure drop through the inlet buffer portion 46a is decreased by increasing the dimension thereof in the depth direction (stacking direction). The pressure drop through the outlet connection channel 58 is increased by making the number of the channel grooves 58a be less than the number of the wave-shaped channel grooves 44a of the oxidant gas channel 44.

The pressure drop through the inlet-side gap portion 54a is set less than the pressure drop through the inlet connection channel 50. The pressure drop through the outlet-side gap portion 54b is set less than the pressure drop through the oxidant gas outlet channel 52b. To be specific, the pressure drop through the inlet connection channel 50 is increased by reducing the number of the channel grooves 50a. The pressure drop may be increased by reducing the dimension of the channel grooves 50a in the height direction. The pressure drop through the oxidant gas outlet channel 52b is increased by using a sealing member made of a material having a high surface tension and by reducing the dimension of the oxidant gas outlet channel 52b in the height direction (stacking direction).

As illustrated in FIG. 1, a coolant channel 60 is formed between a surface 20b of the second metal separator 20 and the surface 18b of the first metal separator 18. The coolant inlet manifold 26a and the coolant outlet manifold 26b are connected to each other through the coolant channel 60. The coolant channel 60 is formed between a back side of the fuel gas channel 34 and the back side of the oxidant gas channel 44 so as to extend in the direction of arrow B.

Figure 2:
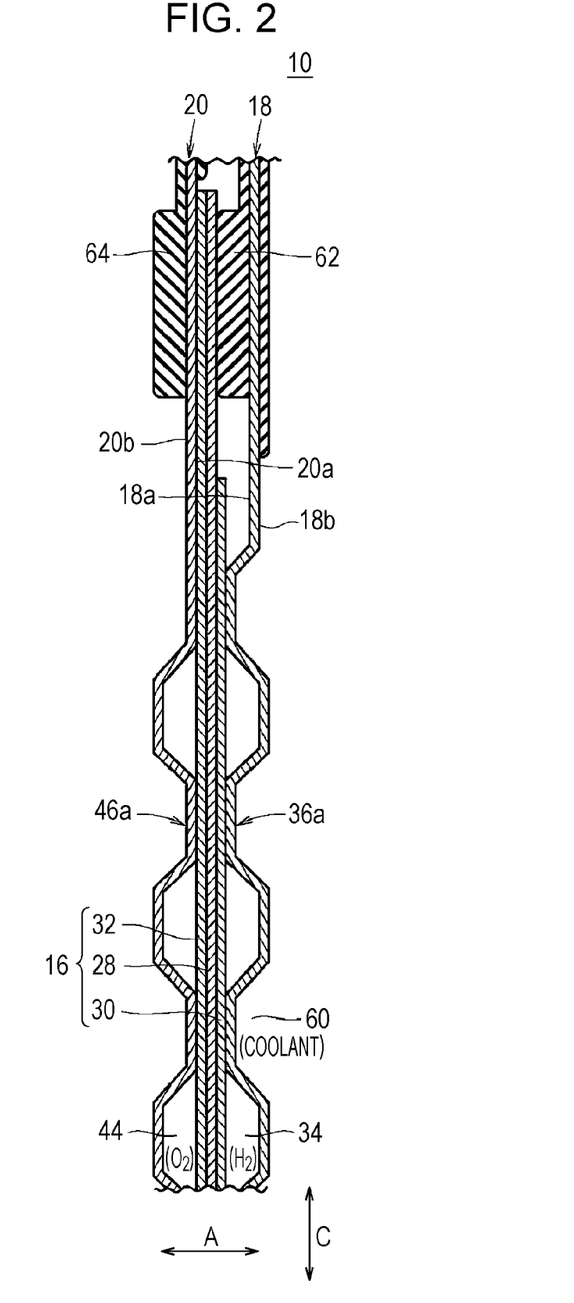
FIG. 2 is a sectional view of the fuel cell taken along line II-II of FIG. 1.

As illustrated in FIG. 2, a first sealing member 62 is integrally formed on the surfaces 18a and 18b of the first metal separator 18 so as to surround the outer periphery of the first metal separator 18. The second sealing member 64 is integrally formed on the surfaces 20a and 20b of the second metal separator 20 so as to surround the outer periphery of the second metal separator 20.

The first sealing member 62 and the second sealing member 64 are made from a sealing material, a cushioning material, or a packing material. Examples of such materials include EPDM, NBR, fluorocarbon rubber, silicone rubber, fluorosilicone rubber, butyl rubber, natural rubber, styrene rubber, chloroprene-rubber, and acrylic rubber.

The operation of the fuel cell 10 will be described below.

First, as illustrated in FIG. 1, in the fuel cell 10, an oxidant gas, such as an oxygen-containing gas, is supplied to the oxidant gas inlet manifold 22a. A fuel gas, such as a hydrogen-containing gas, is supplied to the fuel gas inlet manifold 24a. A coolant, such as pure water, ethylene glycol, or the like, is supplied to the coolant inlet manifold 26a.

The oxidant gas is introduced through the oxidant gas inlet manifold 22a into the oxidant gas channel 44 of the second metal separator 20 and flows along the cathode electrode 32 of the membrane electrode assembly 16.

At this time, as illustrated in FIG. 4, on the surface 20a of the second metal separator 20, the oxidant gas flowing through the oxidant gas inlet manifold 22a passes through the oxidant gas inlet channel 52a, the inlet-side gap portion 54a, and the inlet connection channel 50, and is supplied to the inlet buffer portion 46a.

The oxidant gas supplied to the inlet buffer portion 46a is dispersed in the direction of arrow B, flows vertically downward along the wave-shaped channel grooves 44a of the oxidant gas channel 44, and is supplied to the cathode electrode 32 of the membrane electrode assembly 16.

As illustrated in FIGS. 1 and 3, on the surface 18b of the first metal separator 18, the fuel gas flows through the fuel gas inlet manifold 24a and the supply holes 42a, and is supplied to the surface 18a side. The fuel gas flows through the inlet connection channel 40, and is introduced into the inlet buffer portion 36a.

The fuel gas dispersed in the direction of arrow B in the inlet buffer portion 36a flows vertically downward along the wave-shaped channel grooves 34a of the fuel gas channel 34, and is supplied to the anode electrode 30 of the membrane electrode assembly 16.

Thus, the oxidant gas and the fuel gas, which are respectively supplied to the cathode electrode 32 and the anode electrode 30, are consumed in electrochemical reactions in the electrode catalyst layers of the membrane electrode assembly 16, and thereby electric power is generated (see FIG. 2).

Next, as illustrated in FIG. 4, the oxidant gas supplied to the cathode electrode 32 and consumed flows to the outlet buffer portion 46b, which is connected to a lower part of the oxidant gas channel 44. The oxidant gas passes through the outlet buffer portion 46b, the outlet connection channel 58, the outlet-side gap portion 54b, and the oxidant gas outlet channel 52b, and is discharged to the oxidant gas outlet manifold 22b.

Likewise, as illustrated in FIGS. 1 and 3, the fuel gas supplied to the anode electrode 30 and consumed is supplied to the outlet buffer portion 36b, which is connected to a lower part of the fuel gas channel 34, and then flows through the outlet connection channel 43. The fuel gas passes through the discharge holes 42b toward the surface 18b side, and is discharged to the fuel gas outlet manifold 24b.

The coolant is introduced through the coolant inlet manifold 26a into the coolant channel 60 between the first and second metal separators 18 and 20 and flows in the direction of arrow B (horizontal direction). The coolant cools the membrane electrode assembly 16, and then is discharged from the coolant outlet manifold 26b.

With the present embodiment, as illustrated in FIG. 3, in the first metal separator 18, the pressure drop through the inlet buffer portion 36a is set less than the pressure drop through the fuel gas channel 34. Therefore, water that accumulates in the inlet buffer portion 36a, where continuous channels are not constituted and forms a discontinuous flow, is discharged smoothly to the fuel gas channel 34 due to a differential pressure because the pressure drop on the downstream side is high.

Moreover, the pressure drop through the outlet buffer portion 36b is set less than the pressure drop through the outlet connection channel 43. Therefore, the accumulated water introduced through the fuel gas channel 34 into the outlet buffer portion 36b is smoothly discharged to the outlet connection channel 43, whose pressure drop is set greater than that of the outlet buffer portion 36b, due to a differential pressure.

Thus, accumulated water can be reliably discharged from a surface of the first metal separator 18 and the fuel gas can be made to more uniformly flow through the fuel gas channel 34 with a simple structure.

As illustrated in FIG. 4, in the second metal separator 20, the pressure drop through the inlet buffer portion 46a is set less than the pressure drop through the oxidant gas channel 44. Therefore, water that accumulates in the inlet buffer portion 46a, where continuous channels are not constituted and forms a discontinuous flow, is discharged smoothly to the oxidant gas channel 44 due a differential pressure because the pressure drop on the downstream side is high.

Moreover, the pressure drop through the outlet buffer portion 46b is set less than the pressure drop through the outlet connection channel 58. Therefore, the accumulated water introduced through the oxidant gas channel 44 into the outlet buffer portion 46b is smoothly discharged to the outlet connection channel 58, whose pressure drop is set greater than that of the outlet buffer portion 46b, due to a differential pressure.

Thus, accumulated water can be reliably discharged from a surface of the second metal separator 20 and the fuel gas can be made to more uniformly flow through the oxidant gas channel 44 with a simple structure.

Furthermore, with the present embodiment, the pressure drop through the inlet-side gap portion 54a is set less than the pressure drop through the inlet connection channel 50. In addition, the pressure drop through the outlet-side gap portion 54b is set less than the pressure drop through the oxidant gas outlet channel 52b.

Therefore, water does not accumulate in the inlet-side gap portion 54a and the outlet-side gap portion 54b, and water can be more reliably and smoothly discharged from the surface of the second metal separator 20.

According to the embodiment, a fuel cell includes a membrane electrode assembly including an electrolyte membrane and a pair of electrodes sandwiching the electrolyte membrane therebetween; a separator stacked on the membrane electrode assembly; a reactant gas inlet manifold and a reactant gas outlet manifold through which a reactant gas flows in a stacking direction; and a reactant gas channel through which the reactant gas is supplied along an electrode surface, the reactant gas channel connecting the reactant gas inlet manifold to the reactant gas outlet manifold.

In the fuel cell according to the embodiment, the separator includes an inlet connection channel and an inlet buffer portion that are disposed in this order in a direction from the reactant gas inlet manifold toward the reactant gas channel, the inlet connection channel including a plurality of channel grooves, the inlet buffer portion regulating flow of the reactant gas. The separator further includes an outlet buffer portion and an outlet connection channel that are disposed in this order in a direction from the reactant gas channel toward the reactant gas outlet manifold, the outlet buffer portion regulating flow of the reactant gas, the outlet connection channel including a plurality of channel grooves.

In the fuel cell according to the embodiment, a pressure drop through the inlet buffer portion is set less than a pressure drop through the reactant gas channel, and a pressure drop through the outlet buffer portion is set less than a pressure drop through the outlet connection channel.

It is preferable that, between the reactant gas inlet manifold and the inlet connection channel, a reactant gas inlet channel and an inlet-side gap portion be disposed in this order in a direction in which the reactant gas flows, the inlet-side gap portion making flow of the reactant gas be discontinuous; and that a pressure drop through the inlet-side gap portion be set less than a pressure drop through the inlet connection channel.

It is preferable that, between the reactant gas outlet manifold and the outlet connection channel, an outlet-side gap portion and a reactant gas outlet channel be disposed in this order in a direction in which the reactant gas flows, the outlet-side gap portion making flow of the reactant gas be discontinuous; and that a pressure drop through the outlet-side gap portion be set less than a pressure drop through the reactant gas outlet channel.

With the embodiment, the pressure drop through the reactant gas channel is set greater than the pressure drop through the inlet buffer portion. Therefore, water that accumulates in the inlet buffer portion, where continuous channels are not constituted and forms discontinuous flow, is discharged smoothly to the fuel gas channel due to a differential pressure because the pressure drop on the downstream side is higher. Moreover accumulated water that has been introduced through the reactant gas channel into the outlet buffer portion is smoothly discharged to the outlet connection channel, whose pressure drop is set greater than that of the outlet buffer portion.

Thus, accumulated water can be reliably discharged from a surface of the separator and the reactant gas can be made to more uniformly flow through the reactant gas channel with a simple structure.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell comprising:
a membrane electrode assembly including a first electrode, a second electrode, and an electrolyte membrane provided between the first electrode and the second electrode in a stacking direction; and
a separator provided on the membrane electrode assembly, the separator comprising:
a reactant gas inlet manifold through which a reactant gas is to flow in the stacking direction;
a reactant gas outlet manifold through which the reactant gas is to flow in the stacking direction;
a reactant gas channel through which the reactant gas is to be supplied along an electrode surface of the membrane electrode assembly, the reactant gas channel connecting the reactant gas inlet manifold to the reactant gas outlet manifold;
an inlet connection channel provided between the reactant gas inlet manifold and the reactant gas channel and including a plurality of channel grooves;

an inlet buffer portion provided between the inlet connection channel and the reactant gas channel to regulate flow of the reactant gas, the reactant gas channel and the inlet buffer portion are configured so that a pressure drop through the inlet buffer portion being less than a pressure drop through the reactant gas channel when the reactant gas flows from the reactant gas inlet manifold to the reactant gas channel;

an outlet buffer portion provided between the reactant gas channel and the reactant gas outlet manifold to regulate flow of the reactant gas; and an outlet connection channel provided between the outlet buffer portion and the reactant gas outlet manifold and including a plurality of channel grooves, the outlet buffer portion and the outlet connection channel are configured so that a pressure drop through the outlet buffer portion being less than a pressure drop through the outlet connection channel when the reactant gas flows from the reactant gas channel to the reactant gas outlet manifold.

2. The fuel cell according to claim 1, wherein, the separator comprises a reactant gas inlet channel provided between the reactant gas inlet manifold and the inlet connection channel, and an inlet-side gap portion provided between the reactant gas inlet channel and the inlet connection channel to make flow of the reactant gas discontinuous, and wherein a pressure drop through the inlet-side gap portion is less than a pressure drop through the inlet connection channel when the reactant gas flows from the reactant gas inlet manifold to the reactant gas channel.

3. The fuel cell according to claim 1, wherein, the separator comprises a reactant gas outlet channel provided between the outlet connection channel and the reactant gas outlet manifold, and an outlet-side gap portion provided between the outlet connection channel and the reactant gas outlet channel to make flow of the reactant gas discontinuous, and wherein a pressure drop through the outlet-side gap portion is less than a pressure drop through the reactant gas outlet channel when the reactant gas flows from the reactant gas channel to the reactant gas outlet manifold.

4. The fuel cell according to claim 1, wherein the reactant gas channel includes wave-shaped channel grooves.

5. The fuel cell according to claim 1, wherein the inlet connection channel has a plurality of protruding portions that extend from the inlet buffer portion, wherein the inlet connection channel has a plurality of grooves disposed between the plurality of protruding portions of the inlet connection channel, and wherein the outlet connection channel has a plurality of protruding portions that extend from the outlet buffer portion and a plurality of grooves disposed between the plurality of protruding portions of the outlet connection channel.

6. The fuel cell according to claim 1, wherein the separator further comprises:

a reactant gas inlet channel extending from the reactant gas inlet manifold and provided between the reactant gas inlet manifold and the inlet connection channel; and an inlet-side gap portion provided between the reactant gas inlet channel and the inlet connection channel.

7. The fuel cell according to claim 1, wherein the separator further comprises:

a reactant gas outlet channel extending from the reactant gas outlet manifold and provided between the reactant gas outlet manifold and the outlet connection channel; and an outlet-side gap portion provided between the reactant gas outlet channel and the outlet connection channel.

8. The fuel cell according to claim 1, wherein the separator further comprises a reactant gas inlet channel defined by a bridge extending from the reactant gas inlet manifold and provided between the reactant gas inlet manifold and the inlet connection channel.

9. The fuel cell according to claim 1, wherein the separator further comprises a reactant gas outlet channel defined by a bridge extending from the reactant gas outlet manifold and provided between the reactant gas outlet manifold and the outlet connection channel.

10. The fuel cell according to claim 1, further comprising a reactant gas inlet channel defined by a rubber bridge extending directly from the reactant gas inlet manifold and provided between the reactant gas inlet manifold and the inlet connection channel.

11. The fuel cell according to claim 10, wherein the inlet connection channel has a plurality of protruding portions that extend directly from the inlet buffer portion and a plurality of grooves disposed between the plurality of protruding portions.

12. The fuel cell according to claim 11, wherein the reactant gas inlet channel is aligned with the grooves of the inlet connection channel.

* * * * *